United States Patent
Kuki

[19]
[11] Patent Number: 5,940,770
[45] Date of Patent: Aug. 17, 1999

[54] PORTABLE COMMUNICATION DEVICE

[75] Inventor: Hikaru Kuki, Yamatokoriyama, Japan

[73] Assignee: Sharp Kabushiki Kaisha, Osaka, Japan

[21] Appl. No.: 08/642,673

[22] Filed: May 3, 1996

[30] Foreign Application Priority Data

May 26, 1995 [JP] Japan .................................. 7-128010

[51] Int. Cl.⁶ .................................................. H04B 1/38
[52] U.S. Cl. ......................... 455/510; 455/550; 455/575
[58] Field of Search ..................................... 455/412, 413, 455/414, 415, 418, 419, 420, 509, 550, 510, 567, 566, 575, 422, 425, 552, 553, 557, 556, 512, 466, 527, 528; 379/96, 200, 100.15, 100.16, 102.01, 102.02, 102.03; 370/493, 494, 495

[56] References Cited

U.S. PATENT DOCUMENTS

| | | | |
|---|---|---|---|
| 5,526,398 | 6/1996 | Okada et al. | 455/553 |
| 5,528,664 | 6/1996 | Slekys et al. | 455/466 |
| 5,541,976 | 7/1996 | Ghisler | 455/552 |
| 5,570,413 | 10/1996 | Ahlberg et al. | 455/567 |
| 5,634,197 | 5/1997 | Paavonen | 455/512 |

FOREIGN PATENT DOCUMENTS

| | | |
|---|---|---|
| 2170513 | 3/1995 | Canada . |
| 4-72855 | 3/1992 | Japan . |
| 4-223651 | 8/1992 | Japan . |
| 5-14583 | 1/1993 | Japan . |

*Primary Examiner*—Thanh Cong Le
*Attorney, Agent, or Firm*—Nixon & Vanderhye P.C.

[57] ABSTRACT

A portable communication device has a software processing section and a hardware processing section which are capable of performing wireless voice communication and wireless data communication of different communication modes and communication channels, wherein the portable communication device automatically matches the communication device of the portable communication device and the communication device of the opposite party before the communication is started. The transmitting side of the communication requests switching of the present communication mode or communication channel of the opposite side through a data signal so that the two sides use the same communication mode or communication channel. The transmitting side, thereafter, switches to the wireless voice communication and calls out. The receiving side of the communication switches to the wireless voice communication in accordance with the switching request signal transmitted from the transmitting side, thereby enabling voice communication.

11 Claims, 7 Drawing Sheets

FIG. 3 (a)

| SERVICE IDENTIFICATION NUMBER | 01 IDENTIFICATION NUMBER FOR SWITCHING COMMUNICATION MEANS<br>00 OTHER SIGNALS |
|---|---|
| SENDER'S NUMBER | 12345 (MR. YAMADA TAROU)<br>54321 (MR. SUZUKI JIROU) |
| SIGNAL IDENTIFICATION NUMBER | 01 SWITCHING REQUEST SIGNAL<br>02 SWITCHING REQUEST ACCEPTANCE SIGNAL<br>03 SWITCHING REQUEST REJECTION SIGNAL<br>04 OTHER SIGNALS (RESERVED) |
| OPTION IDENTIFICATION NUMBER | 01 MESSAGE<br>02 FORWARDING PARTY DESIGNATION |
| OPTION SIGNAL | MESSAGE, "MEETING", "WILL BE AVAILABLE AT 6:30",<br>"WILL FORWARD TO SECRETARY"<br>FORWARDING PARTY 03-123-XXXX(TELEPHONE NUMBER) |

FIG. 3 (b)

| SERVICE IDENTIFICATION NUMBER | SENDER'S NUMBER | SIGNAL IDENTIFICATION NUMBER | OPTION NUMBER | OPTION |
|---|---|---|---|---|
| 01 | 12345 | 01 | | |

FIG. 3 (c)

| 01 | 54321 | 02 | | |
|---|---|---|---|---|

FIG. 3 (d)

| 01 | 54321 | 03 | | |
|---|---|---|---|---|

FIG. 3 (e)

| SERVICE IDENTIFICATION NUMBER | SENDER'S NUMBER | SIGNAL IDENTIFICATION NUMBER | OPTION NUMBER | | OPTION | |
|---|---|---|---|---|---|---|
| | | | 01 | "MEETING" | | |
| | | | 01 | "WILL FORWARD TO SECRETARY" | 02 | 03-123-xxxx |

FIG. 4 (a)

| REGISTERED PARTY | SETTING OF ACCEPTANCE/REJECTION | MESSAGE | FORWARDING PARTY |
|---|---|---|---|
| UNSPECIFIED (UNDESIGNATED PARTIES) | 8:00am — REJECTION<br>10:00am — ACCEPTANCE<br>12:00pm — REJECTION<br>3:00pm — ACCEPTANCE<br>8:00pm — REJECTION | "MEETING"<br><br>"PLEASE CALL AGAIN TOMORROW" | |

FIG. 4 (b)

| REGISTERED PARTY | SETTING OF ACCEPTANCE/REJECTION | MESSAGE | FORWARDING PARTY |
|---|---|---|---|
| SENDER'S NUMBER 12345<br>NAME MR. YAMADA TAROU | 8:00am — REJECTION<br>10:00am — REJECTION<br>12:00pm — ACCEPTANCE<br>3:00pm — REJECTION<br>8:00pm — ACCEPTANCE | "AT MEETING, WILL FORWARD TO SECRETARY"<br><br>"WILL FORWARD TO HOME" | 03-123-xxxx<br><br>03-ooo-xxxx |

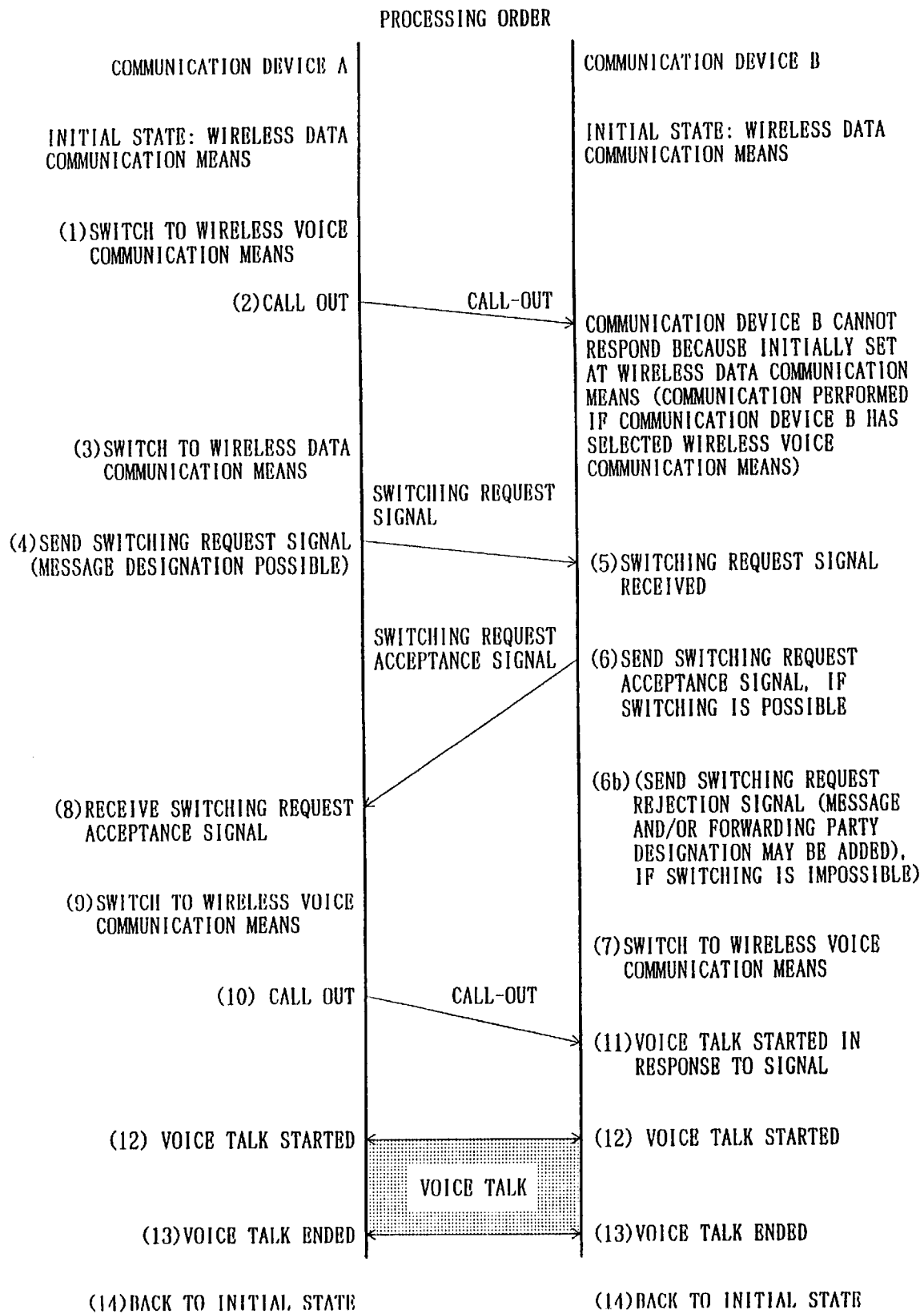

PORTABLE COMMUNICATION DEVICE

FIELD OF THE INVENTION

The present invention relates to a portable communication device having two means: wireless voice communication means and wireless data communication means.

More specifically, the present invention further relates to a portable communication device capable of selecting one of the wireless voice communication means and the wireless data communication means.

The wireless voice communication means refers to telephone means including stand-by voice communication for a wireless call-in and a wireless call-out, whereas the wireless data communication means refers to means for wireless transmission, wireless reception and reception stand-by of digital data.

The wireless voice communication and the wireless data communication of the present invention employ a different communication mode and channel from each other. When processings of communication and stand-by are being performed by one of the two communication modes of the present invention, those processings in the other mode cannot be simultaneously performed.

That is, the present invention relates to a portable communication device which cannot perform the wireless data communication while performing the wireless voice communication, and vice versa. Some conventional examples of this kind are a cellular telephone and a two-way pager, both of which are already in service; a cellular telephone and a wireless packet transmission; a voice talk on a voice channel of a digital system cellular telephone and data communication on a control channel of such a telephone.

BACKGROUND OF THE INVENTION

When using a communication device incorporating both the wireless voice communication means and the wireless data communication means, a user needs to select, depending on needs of the user, one of the communication means manually.

Conventionally, switching techniques have been invented for this purpose. For example, Japanese Laid-Open Patent Application No. 72855/1992 (Tokukaihei 4-72855) discloses a switching technique between a telephone and a modem: Japanese Laid-Open Patent Application No. 14583/1993 (Tokukaihei 5-14583) discloses a switching technique between a telephone and a facsimile: Japanese Laid-Open Patent Application No. 223651/1992 (Tokukaihei 4-223651) discloses a switching technique between a facsimile and an answering machine. Nevertheless, these patents concerns one telephone line, and therefore only deals with a switching on the same communication channel. By contrast, the present invention deals with a switching with respect to a plurality of communication means and channels.

When a sending party and a receiving party are to communicate with each other, the two parties need to select the same communication means. Here occurs a trouble: If the user and the opposite party have selected different communication means from each other, the opposite party needs to manually switch to the communication means selected by the user in order to communicate with the user.

Moreover, even when the receiving party is to manually switch to the same communication means with that of the sending party, the receiving party still needs to know in advance which means the sending party is going to use. Besides, the receiving party needs to inform the sending party when the communication will be possible.

Private companies have already put in service, systems which enable communication devices to be switched by the wireless data communication means from the wireless data communication means to the wireless voice communication means. But the availability of the systems totally depends on the companies.

The present invention resolves the above-noted problem that the sending and receiving parties need to select the same communication system in order to communicate with each other, and that the two parties cannot communicate with each other if the communication system selected by the user is different from that of the opposite party. With this technique, even when the communication system does not provide the switching between the communication means, the communication devices can still switch the communication means only by communication between the communication devices.

Additionally, the present invention provides the user with a convenient function of permitting or not permitting the switching between the communication means with respect to time and/or the opposite party.

In view of the trouble that when voice communication is to be performed with a receiving party having a communication device incorporating the two means (namely, the wireless voice communication means and the wireless data communication means), the sending and receiving parties need to select the same wireless communication means, a first problem is how the two parties far away from each other select the same communication means.

A second problem is that if the portable wireless device of a transmitting side has both the wireless voice communication means and the wireless data communication means, and the same communication means is to be selected, the transmitting side needs to switch to the wireless voice communication means, as well as to request the receiving side to switch to the wireless voice communication means.

A third problem is that since the receiving side is not always in a state capable of performing the voice communication in response to a request from the sending side for the switching to the wireless voice communication means, it is necessary to inform the sending side whether or not the receiving side can perform the voice communication.

A fourth problem is that since the receiving side may want to talk only with some specific people, the receiving side needs to decide, depending on the opposite party on the transmitting side, whether the receiving side switches in response to a switching request from the sending side.

A fifth problem is that when a switching request rejection notice is sent back to the opposite party, the opposite party may want to know when the voice communication will be possible, or why the switching is impossible. For these reasons, the present invention realizes such functions by including a message in the sent-back switching request rejection signal.

A sixth problem is that the receiving party of the switching request signal, although not available for voice communication, still wants a third party to answer the call in place of the receiving party. For this reason, the present invention includes a function enabling the transmitting party of the switching request signal to talk with the third party.

SUMMARY OF THE INVENTION

An object of the present invention is to provide, in a portable communication device, a device and technique to automatically match communication modes used by the two parties of the communication before the communication is started.

In order to accomplish the object, a portable communication device in accordance with the present invention enables voice communication by adopting a first device which switches to a wireless voice communication device by receiving a switching request signal transmitted from the sending side.

In order to carry out this technique, the portable communication device needs the following devices.

The portable communication device, as a second device, requests the switching of the present communication mode of an opposite side, then switches to a preferred communication mode, and calls out.

The portable communication device, as third device, has a function of, when the portable communication device receives the switching request, judging whether or not the switching is possible, and then (1) informing, when the switching is possible now, the sending party that the switching to the requested communication mode is possible, and (2) informing, when the switching is impossible now, the sending party that the switching is impossible now.

The portable communication device, as fourth device, judges whether the switching is performed depending on the opposite party transmitting the switching request, and sends a signal representative whether or not the switching is possible.

The portable communication device, as fifth device, has a function of informing, when the switching is impossible, in the form of a message, the opposite party why the switching is impossible and when the switching will be possible.

The portable communication device, as sixth device, further has a function of designating, when the switching is impossible, a third party who can talk over the telephone in place of the receiving party of the communication, and letting the opposite party call out the designated third party.

According to the portable communication device in accordance with the present invention, it is possible to automatically match, from a distance, the communication devices of the two devices having both functions of the wireless voice communication and the wireless data communication and to perform voice communication.

For a fuller understanding of the nature and advantages of the invention, reference should be made to the ensuing detailed description taken in conjunction with the accompanying drawings.

BRIEF DESCRIPTION OF THE DRAWINGS

FIGS. 3(a) to 3(e) are drawings showing a specific example of the switching signal of the portable communication device.

FIGS. 4(a) and 4(b) are drawings showing specific examples of a setting of a memory section of the portable communication device.

FIG. 5 is a time chart showing an order of processings by the portable communication device.

DESCRIPTION OF THE EMBODIMENTS

The following description will discuss a portable communication device in accordance with the present invention in conjunction with the drawings.

Figure 1:
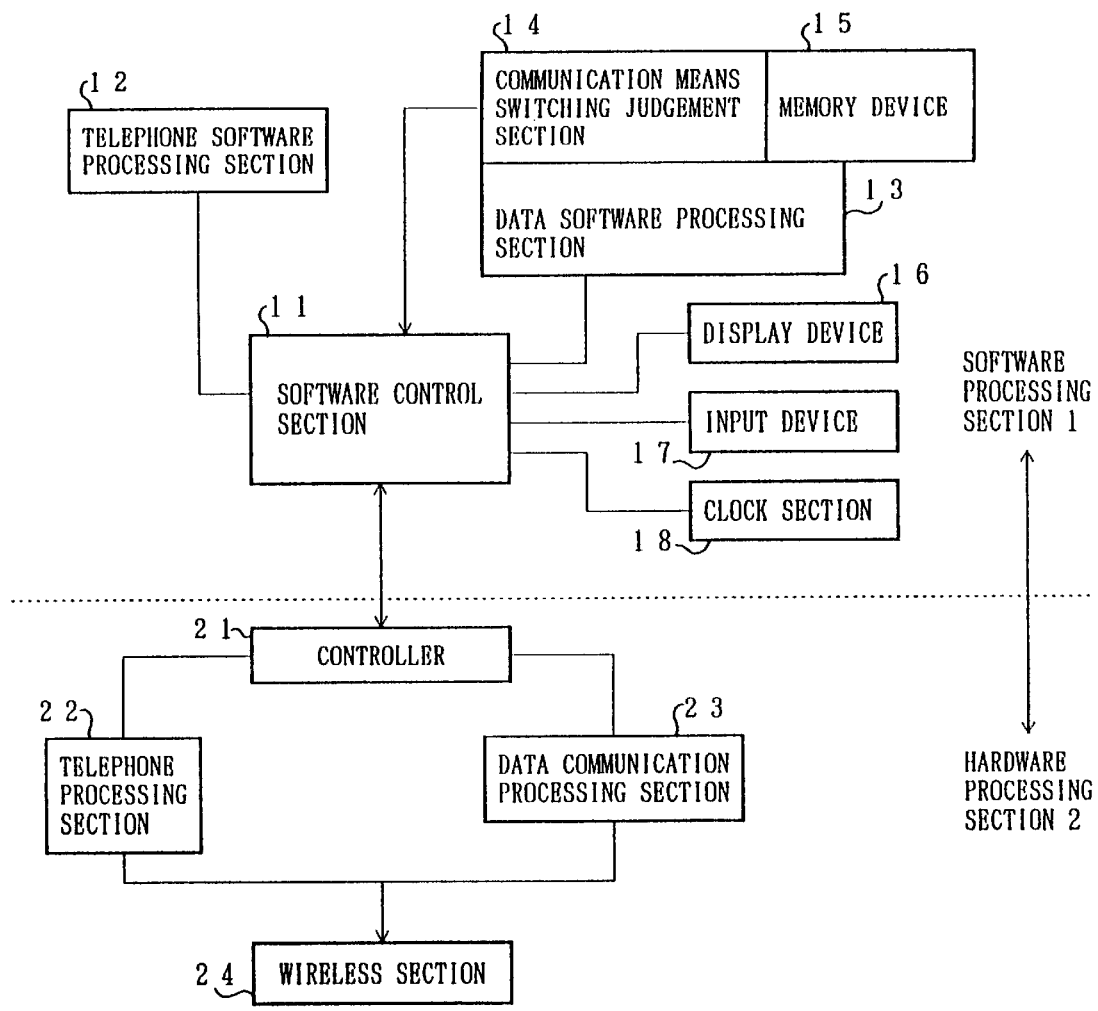
FIG. 1 is a block circuit diagram showing a portable communication device in accordance with the present invention.

FIG. 1 is a block circuit diagram showing the portable communication device in accordance with the present invention, which is divided into two sections: a software processing section 1 and a hardware processing section 2.

The software processing section 1 includes a software control section 11, a telephone software processing section 12 and a data software processing section 13. The software control section 11 is connected to a display device 16 as information display means, an input device 17 as information input means, and a clock section 18 for telling the time.

The hardware processing section 2 includes a controller 21, a telephone processing section 22, a data communication processing section 23 and a wireless section 24. The telephone processing section 22 processes voice modulation. The telephone software processing section 12 has a function controlling protocol for wireless voice communication. The data communication processing section 23 controls data modulation and data communication. The data software processing section 13 has a function controlling protocol for data communication, and judges whether an input signal is a signal concerning a switching of the communication means.

The wireless section 24 converts a data communication signal or voice signal fed from the hardware processing section into a wireless signal and then transmits the wireless signal. Moreover, the wireless section 24 performs a processing for converting a received wireless signal into a data communication signal or voice signal and inputting the converted signal to the hardware processing section.

That is, when the wireless voice communication means is selected, the telephone software processing section 12, the telephone processing section 22 and the wireless section 24 are in operation; when the wireless data communication means is selected, the data software processing section 13, the data communication processing section 23 and the wireless section 24 are in operation. The wireless section 24 is shared by the two communication means for communication or a telephone call. It should be noted, however, that the present invention relates to a communication device which cannot operate both communication means simultaneously.

A communication means switching judgement section 14 functions as an application of the data software processing section 13.

The controller 21 switches between the wireless voice communication mode and the wireless data communication mode on the hardware.

The software control section 11 switches between the telephone software processing section 12 and the data software processing section 13 on a software level, and instructs the controller 21 of the hardware section about the switching.

The communication means switching judgement section 14 analyzes received data about the communication means switching, and, depending upon the judgement, switches the communication means and sends back signals.

Figure 2:
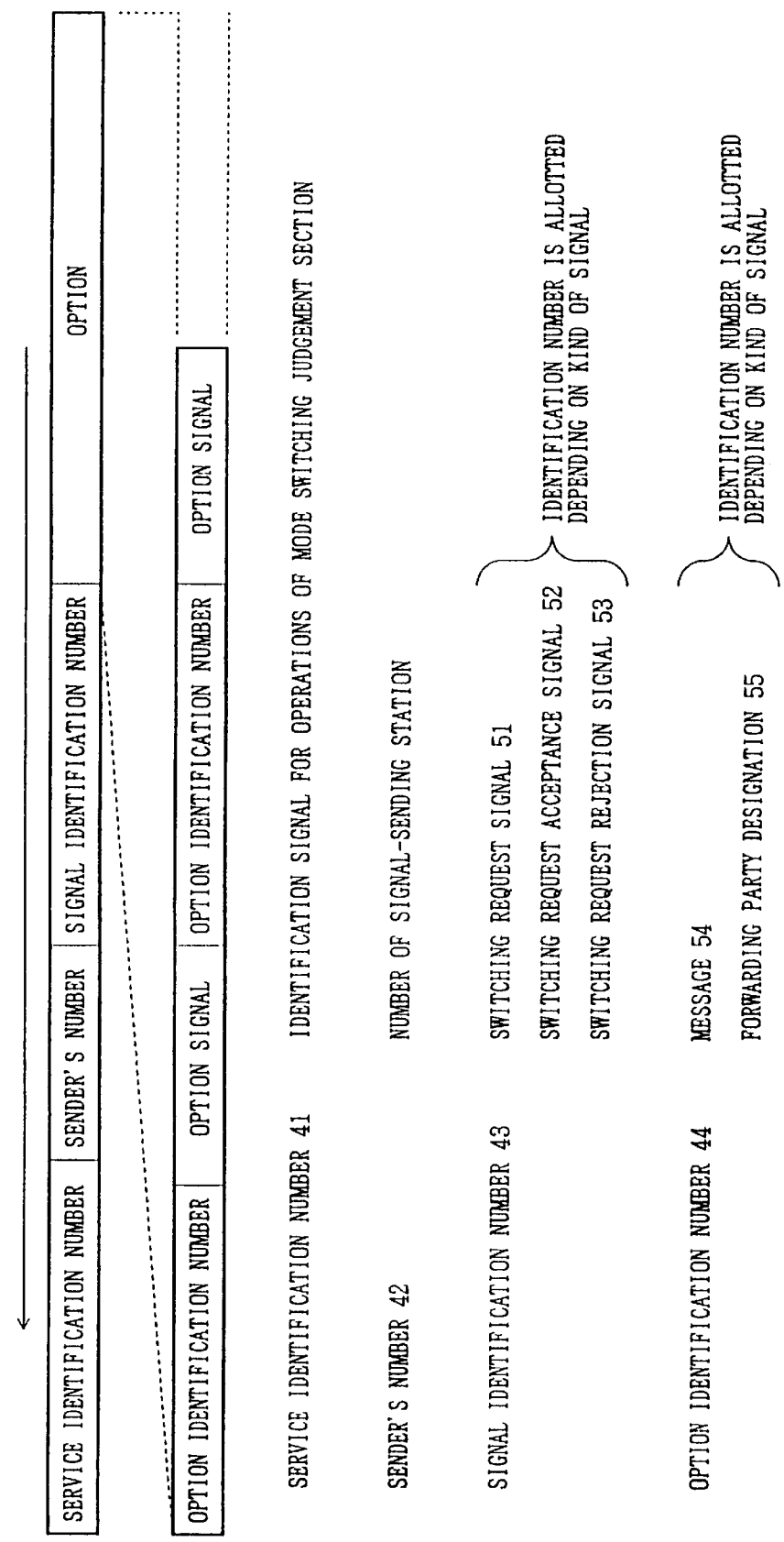
FIG. 2 is a drawing showing an arrangement example of a format of a mode switching signal in the information field of data communication of the portable communication device.

FIG. 2 is an arrangement example of a format of these signals. Every signal is provided with a service identification signal 41 in accordance with a request, a sender's number 42 unique to a communication device of a sending party, and a signal identification number 43.

The service identification signal 41 is used in the data software processing section 13 for judging whether or not an input signal is a signal concerning the switching. If the service identification signal 41 agrees with a predetermined signal, the data software processing section 13 transmits the input signal to the mode switching section 14. The signal identification number 43 is used in the mode switching judgement section 14 for identifying the kind of the input signal (namely, a switching request signal, a switching request acceptance signal or a switching request rejection signal).

The sender's number 42 is a unique number to the sender, through which a receiving party identifies the opposite party.

The sending party may add a message and a forwarding party designation as an option signal 45, which is identified through an option identification number 44.

There are 3 kinds of signals concerning the switching of the communication means:

(1) the switching request signal 51 to the opposite party, (2) the switching request acceptance signal 52, and (3) the switching request rejection signal 53.

The message and the forwarding party designation are added to the switching request rejection signal 53 if necessary.

FIGS. 3(a) to 3(e) show an example of various signals generated according to the above-noted signal format.

FIG. 3(a) shows an example, wherein specific numbers are allotted to the identification number and the option number of the switching signal. FIGS. 3(b) to 3(e) show an example of various signals generated in accordance with those specific numbers.

FIG. 3(b) is an example of the switching request signal, FIG. 3(c) is an example of the switching request acceptance signal, FIG. 3(d) is an example of the switching request rejection signal with the additional message, and FIG. 3(e) is an example of the switching request rejection signal with the additional message and forwarding party designation.

The communication means switching judgement section 14 has a memory device 15 for memorizing information for judging whether or not the switching of the communication means is possible. The information, including a period during which the switching is impossible, time when the switching becomes possible, the third party to which a call is forwarded when the switching is impossible and the message to be sent when the switching is impossible, is set for each party to which the information is to be transmitted.

FIGS. 4(a) and 4(b) show examples of the setting in the memory device 15.

FIG. 4(a) shows such an example of the memory setting for answering a switching request from an unspecified sending side. The setting, including a message and/or a forwarding party transmitted when the switching is impossible, changes with respect to time.

FIG. 4(b) shows such an example of the memory setting for answering a switching request from a specified sending side. The setting, including a message and/or a forwarding party transmitted when the switching is impossible, changes with respect to time.

When the switching request is received, the communication means switching judgement section 14 judges whether or not the switching is possible, for example, in accordance with the information stored in the memory device 15.

For example, when a switching request is sent at 12:30 pm from a sending side of number 12345, the communication device of the receiving side, referring to the set memory in the memory device 15, sends to the sending side a signal representative of that the receiving side cannot respond to the request, because 12:30 pm is set to be in a period during which the responding is impossible. Nevertheless, since there is a message stored for the period, the device adds the message. Moreover, since there is a designated forwarding party for the period, the number of the forwarding party is added.

Next, the following description will discuss operations and/or effects of portable communication devices which correspond to the below-noted first to sixth portable communication devices.

The following description will discuss operations of a portable communication device corresponding to a first portable communication device.

The switching request signal 51 sent from the outside is transmitted through the wireless section 24, the data communication processing section 23 and the software control section 11 to the data software processing section 13. The data software processing section 13 judges, through the service identification signal 41 included in the transmitted signal, that the signal is a signal concerning the switching of the communication means, and transmits the signal to the communication means switching judgement section 14. The communication means switching judgement section 14 judges, through the signal identification number 43, that the transmitted signal is the switching request signal 51. The communication means switching judgement section 14 then judges whether or not the switching is possible at the time (described in detail later). If the communication means switching judgement section 14 judges that the switching is possible, the communication means is switched to wireless telephone communication means.

When the communication means is switched, the software control section 11, upon reception of an instruction from the communication means switching judgement section 14, switches among the data communication processing section 23, the telephone software processing section 12 and the data software processing section 13, and outputs a switching signal to the controller 21 at the same time.

The controller 21, upon reception of the switching signal, switches between the telephone processing section 22 and the data communication processing section 23.

The software control section 11 has the display device 16. The display device 16, controlled by the software control section 11, displays processings by the communication means switching judgement section 13 and a received message.

The following description will discuss operations of a portable communication device corresponding to a second portable communication device.

In a case where the sending party, using a communication device of his own, requests the switching of the communication means of the communication device of the opposite party from the wireless data communication means to the wireless voice communication means, the communication device of the sender transmits the predetermined signal through the wireless data communication means. According to an instruction of the sending party, the communication means switching judgement section 14 generates the switching request signal 51. The service identification signal 41 and the signal identification number 43 are added to the switching request signal 51 in accordance to the request.

The generated signal is transmitted as a wireless data signal through the data software processing section 13, the software control section 11, the data processing section 23 and the wireless section 24.

Then, if the communication device of the sending party receives a response signal from the opposite party, and the switching request acceptance signal is received, the communication device switches to the wireless voice communication means in accordance with an instruction of the communication means switching judgment section 14.

If the communication device of the sending party receives the switching request rejection signal, or no response signal within a predetermined time, the communication device does not switch to the wireless voice means, and gives up the call-out by the voice means.

The following description will discuss operations of a portable communication device corresponding to a third portable communication device.

According to the portable communication device corresponding to the first portable communication device, the switching request signal 51 received from the outside is transmitted to the communication means switching judgement section 14. The user has two methods of making a judgement whether or not the switching of the communication means is possible. According to one of the methods, the communication means switching judgement section 14 displays on the display device 16 through the software control section 11 that a switching request has already arrived. The user reads the display and judges if the switching is needed. The user then inputs the result of the judgement whether or not the switching is to be performed.

According to the other method, the memory device 15 memorizes in advance a setting by the user about whether or not the switching is possible. The user sets time when the voice communication is possible and time when the voice communication is impossible. When the switching request signal 51 arrives, the judgement whether or not the switching is possible is made in accordance with the memory.

When the judgement is made that the switching is possible, a switching request acceptance signal 52 designated in advance is generated by the communication means switching judgement section 14. The switching request acceptance signal 52 is provided with a corresponding service identification signal 41 and a corresponding signal identification number 43. The generated signal is then sent as a wireless data signal through the data software processing section 13, the software control section 11, the data communication processing section 23 and the wireless section 24. After that, instructed by the communication means switching judgement section 14, the switching to the wireless voice communication means is performed in order to receive the wireless voice communication.

When the judgement is made that the switching is impossible, a switching request rejection signal 53 designated in advance is generated by the communication means switching judgement section 14. The signal switching request rejection signal 53 is provided with a corresponding service identification signal and a corresponding signal identification number. The generated signal is then sent as a wireless data signal through the data software processing section 13, the software control section 11, the data processing section 23 and the wireless section 24.

The following description will discuss operations of a portable communication device corresponding to a fourth portable communication device.

According to the portable communication device corresponding to the first portable communication device, a switching request signal 51 received from the outside is transmitted to the communication means switching judgement section 14. The user has another method of making the judgement whether or not the switching of the communication means is possible, apart from the methods discussed in the description about the operations of the portable communication device corresponding to the third portable communication device. According to that method, a reference is made to the sender's number 42 of the switching request signal 51, and the switching of the communication means is made possible or impossible only for a designated sending party.

According to the method, the judgement is made in accordance with the memory set in advance by the user in the memory device 15 about whether the switching is possible or impossible for every sender's number 42. When the switching request signal 51 arrives, the judgement is made whether or not the switching is possible in accordance with the memory that the switching is possible or impossible for that sender's number 42.

After the judgement is made whether the switching is possible or impossible, the same processings with the communication device corresponding to the third portable communication device are performed.

The following description will discuss operations of a portable communication device corresponding to a fifth portable communication device.

According to the portable communication device corresponding to the third portable communication device, the switching request signal 51 received from the outside is transmitted to the communication means switching judgement section 14. Then, the judgement is made whether or not the switching of the communication means is possible. When the switching is judged impossible, the switching request rejection signal 53 designated in advance is generated by the communication means switching judgement section 14. The signal 53 is provided with the message selected by the sending party of the switching request rejection signal 53.

When the user cannot perform the switching, the user sets in advance a message to be added in the memory device 15. The user may set a different message for every period or every opposite party, if necessary.

When the communication device responds that the switching is impossible, the different message for every period or every opposite party may be inserted, if necessary, after the option identification number 44 representative of the message shown in FIG. 2 in the signal.

The generated signal is sent as a wireless signal through the data software processing section 13, the software control section 11, the data processing section 23 and the wireless section 24.

When the communication device of the opposite party receives the signal, the communication device of the opposite party processes the signal in the same ways. When a message is found, the message is displayed by the display device 16 on the communication device of the opposite party.

The following description will discuss operations of a portable communication device corresponding to a sixth portable communication device.

According to the portable communication device corresponding to the third portable communication device, a switching request signal 51 received from the outside is transmitted to the communication means switching judgement section 14. Then, the judgement is made whether or not the switching of the communication means is possible. When the switching is judged impossible, the switching request rejection signal 53 designated in advance is generated by the communication means switching judgement section 14. The switching request rejection signal 53 is provided with, apart from the corresponding service identification number and signal identification number, a forwarding party designation if selected so by the sending party. The user inputs in advance in the memory device 15 a number of voice talk means of a forwarding party in case that the user cannot make the switching. The user may input a different forwarding party for every period or every opposite party if necessary.

Such a different forwarding party for every period or every opposite party may be inserted, if necessary, after the option identification number representative of the forwarding party in the switching request rejection signal shown in FIG. 2.

The generated signal is sent as a wireless signal through the data software processing section 13, the software control section 11, the data processing section 23 and the wireless section 24.

When the communication device of the opposite party receives the signal, and the communication means switching judgement section 14 of the communication device of the opposite party perform a processing of the signal, if the forwarding party designation is found, the communication device automatically tries to call out the forwarding party by the voice communication means.

Assuming that a communication device A and a communication device B are currently used, the following description will discuss operation processes of the present portable communication device in conjunction with FIG. 5.

The communication devices A and B incorporate the same wireless voice communication means and wireless data communication means.

Assume that the communication device A performs the wireless voice communication with the communication device B.

Assume that both communication devices A and B are set to operate in the data communication mode as a initial condition.

Firstly, the communication device A, in a attempt to perform the wireless voice communication, (1) automatically operates the wireless voice communication means thereof and (2) calls out the communication device B (If the wireless voice communication means was selected for the communication device B, the communication device B would respond to the call-out by the communication device A, enabling the users to talk over the communication devices A and B).

(3) When there is no response for the call-out, the communication device A switches to the data communication means.

Secondly, (4) the communication device A transmits a switching request signal to the communication device B.

(5) The communication device B receives the signal. The communication device B then judges whether or not the switching of the communication means is possible.

The judgement is made in accordance with either of the following two methods. According to one of the methods, when the request signal is received, the user makes the judgement from a display of that information . According to the other, the judgement is made in accordance with the information set in advance about the received transmitting party number of the communication device A, the information representing the period during which the switching of the communication means is impossible, and the period during which the switching of the communication means is possible (if the communication device A is unknown, information for the unknown transmitting party is prepared).

If the communication device B can switch the communication means, (6) the communication means B transmits a switching request acceptance signal to the communication device A, and (7) then switches to the wireless voice communication means.

If the communication device B cannot switch the communication device, the communication device B (6b) transmits a switching request rejection signal.

The notification about the rejection of the switching of the communication means may include the different messages and the forwarding party designations prepared in advance for every transmitting party.

The communication device A (8) receives the signal from the communication device B. If the signal is the switching request acceptance signal, the communication device A then (9) switches to the wireless voice communication means, and (10) calls out by the wireless voice communication means.

The communication device B (11) responds to the call-out of the communication device A, (12) enabling the communication by the wireless voice communication means.

If the communication device A receives no response through a signal from the communication device B within a certain period of time, or if the communication device A receives the notification from the communication device B that the switching of the communication means is impossible, the communication device A gives up the call-out. Moreover, the communication device A starts the processes all over again from the process (1) above if a predetermined time is set and elapses.

Besides, if a forwarding party is designated, the communication device A calls out the forwarding party.

If a certain period of time elapses after switching to the voice communication means without receiving a call-out from the communication device A, the communication device B returns to the initial state before performing the communication.

When the voice talk over the telephone is over, the communication devices A and B (14) return to the initial state before performing the communication.

Figure 6:
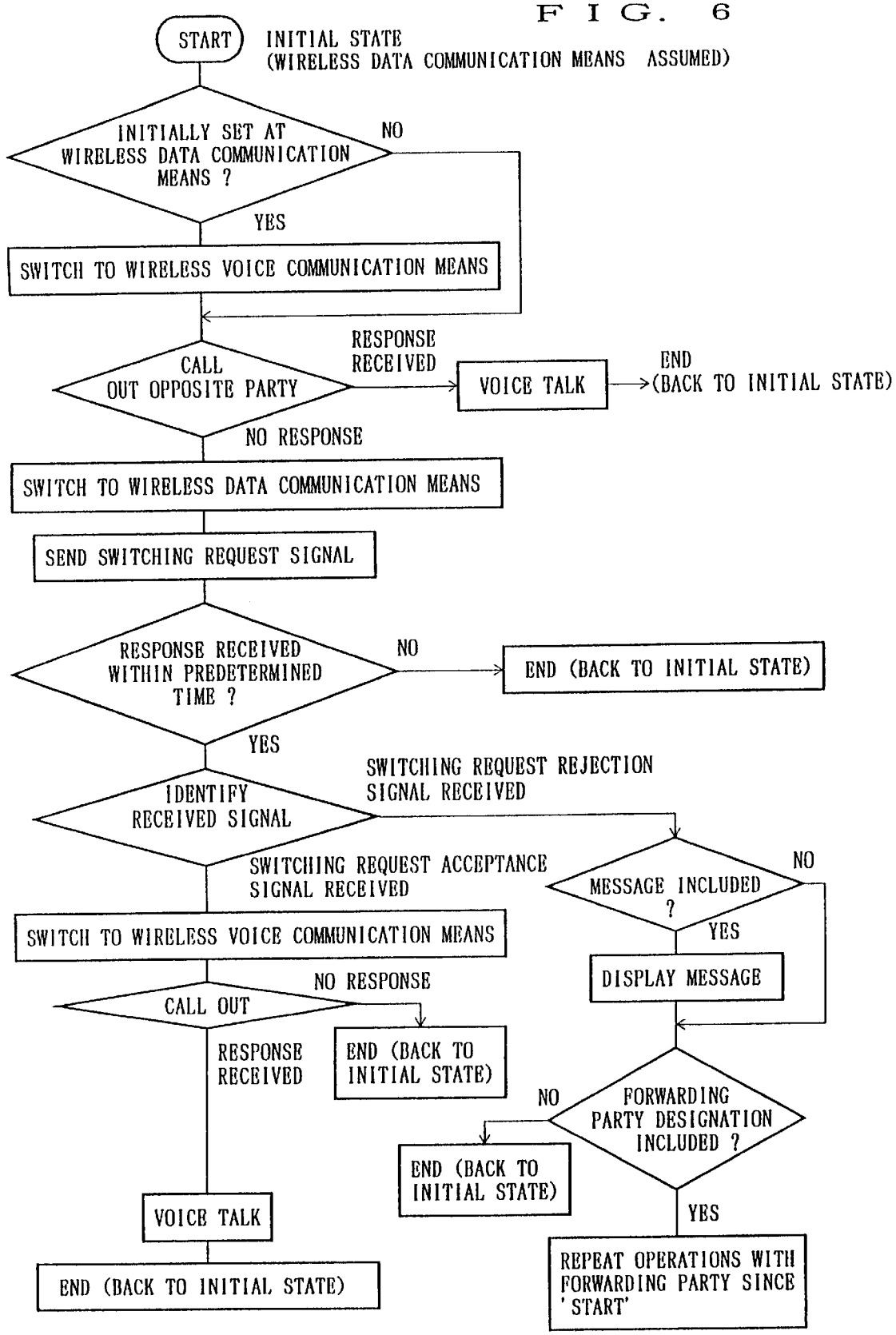
FIG. 6 is a flowchart of a transmitting side of the portable communication device.
Figure 7:
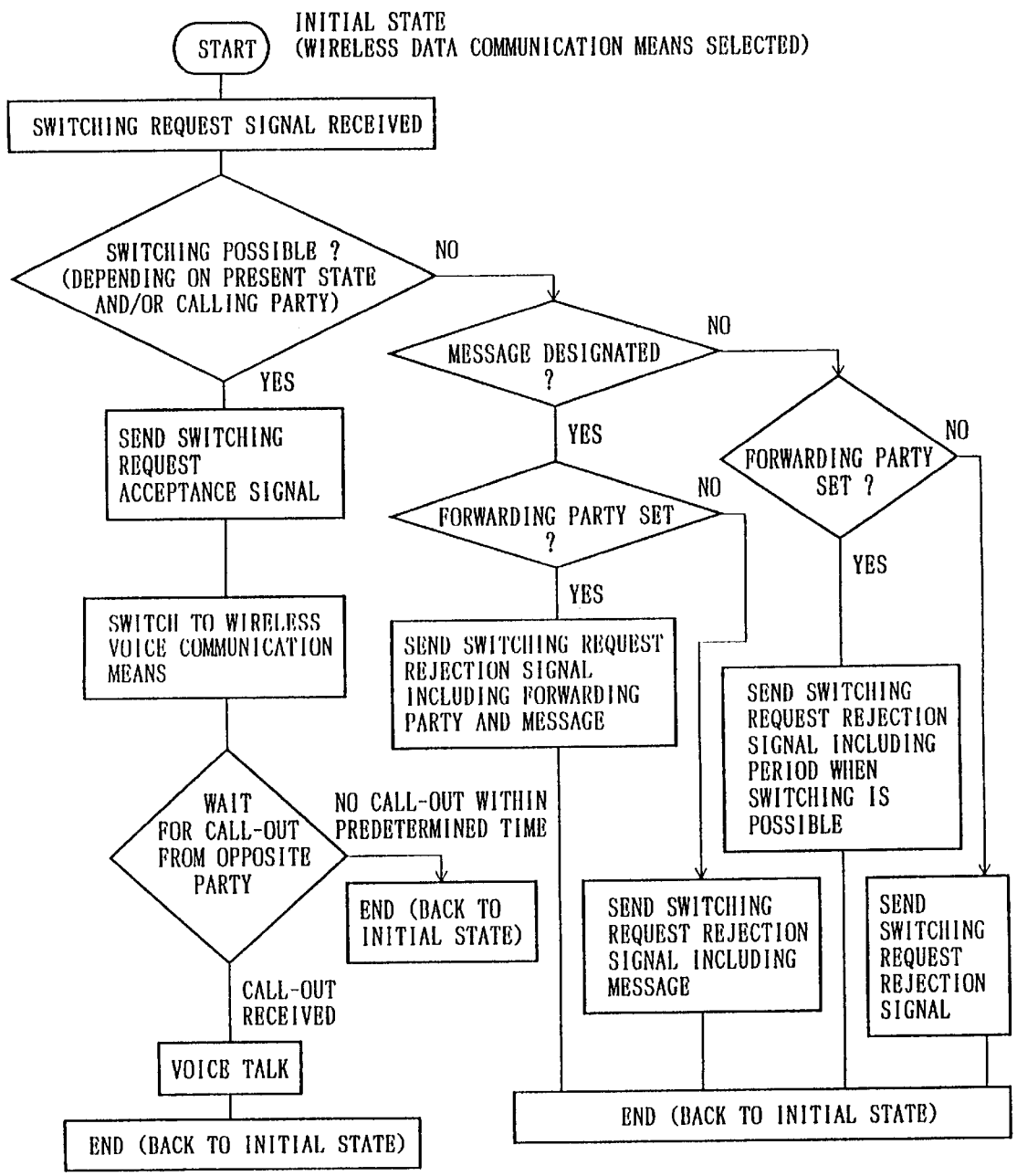
FIG. 7 is a flowchart of a receiving side of the portable communication device.

The above description has discussed the operation processes of the present portable communication device. FIGS. 6 and 7, both being a flowchart, separately show, respectively, the operation processes by the communication device of the transmitting side and the operation processes by the communication device of the receiving side.

As discussed above, the portable communication device in accordance with the present invention employs the technique of communication means switching, and is therefore capable of switching the communication means from a distance. Consequently, the device enables the user to communicate by preferred communication means even when a communication device at a distance place is initially set to operate by different communication means.

Moreover, even when the opposite party can or cannot perform the switching, a message regarding to the state is sent. This side can thus understands the situation. Furthermore, this side can switch the communication means in synchronization with the switching of the opposite party. Therefore, no time is wasted.

According to the first portable communication device in accordance with the present invention, when the voice communication is to be performed with the receiving party having the communication device incorporating the wireless voice communication means and the wireless data communication means, the receiving side receives the switching request signal from the sending side and then switches to the wireless voice communication means. Thus, the device can perform the communication by communication means preferred by the user even from a distance place.

According to the second portable communication device device in accordance with the present invention, in the first portable communication, in a case where the sending side has the two means (the wireless voice communication means and the wireless data communication means), the sending side has the functions to switch to the wireless voice communication means after transmitting the switching request by communication device wireless data communication means and to call out. Consequently, the sending side can talk over the phone by one communication device.

According to the third portable communication device in accordance of the present invention, in the first portable communication device, when the sending side requests the switching to the wireless voice communication means, the receiving side sends to the sending side the acceptance or rejection of the switching request depending on the situation of the receiving side. Consequently, the sending side can know whether or not the voice communication is possible.

According to the fourth portable communication device in accordance of the present invention, in the third portable communication device, when the sending side requests the switching of the communication means, the receiving side adds functions to send the signal representative of whether or not the switching is possible depending on the opposite party of the receiving side. Consequently, the receiving side can talk over the phone only with particular people.

According to the fifth portable communication device in accordance of the present invention, in the fourth portable communication device, when the switching request rejection notification is sent to the opposite party, the message is included in the switching request rejection signal. Consequently, the opposite party receiving the signal can know when the voice communication will be possible, or why the switching is impossible.

According to the sixth portable communication device in accordance of the present invention, in the fifth portable communication device, the transmitting party of the switching signal can let the third party talk over the phone instead by including the function enabling the call to be forwarded to the third party when the receiving party of the switching request signal cannot talk over the phone at the moment.

The invention being thus described, it will be obvious that the same may be varied in many ways. Such variations are not to be regarded as a departure from the spirit and scope of the invention, and all such modifications as would be obvious to one skilled in the art intended to be include within the scope of the following claims.

What is claimed is:

1. A portable communication device having wireless voice communication means and wireless data communication means which adopt a different communication mode from each other and are incapable of being used simultaneously, one of said two communications means being used selectively,
   wherein said portable communication device transmits a predetermined signal to a receiving communication device having wireless voice and data communication modes, and the signal including a request for switching the receiving communication device from the data communication mode to the voice communication mode, and switches the portable communication device to the wireless voice communication mode to start voice communication.

2. A portable communication device having wireless voice communication means and wireless data communication means which adopt a different communication mode from each other and are incapable of being used simultaneously, one of said two communications means being used selectively,
   wherein when a communication device of an opposite party requests said portable communication device to switch modes, the portable communication device enables a user to select whether the switching of modes is to be performed according to a time when the request is made, or according to a predetermined setting of said portable communication device, and
   then said portable communication device transmits a predetermined signal indicating that switching of modes is to occur, when switching is selected, and switching the communication device to a stand-by state to await for a further signal by said wireless voice communication means, and
   transmitting, a response that the switching is impossible through a predetermined signal when switching is not selected.

3. The portable communication device as defined in claim 2,
   said portable communication device having a function of, when the communication device of the opposite party requests the switching of said communication means of said portable communication device, transmitting the response that the switching is possible or that the switching is impossible according to a judgment directly made by the user depending on the opposite party whether or not the switching is to be performed, or according to a predetermined setting state with respect to the opposite party.

4. The portable communication device as defined in claim 3,
   said portable communication device having a function of informing the opposite party why the switching is impossible and when the switching will be possible by including a message made by a sending party of the response in the response signal that the switching is impossible.

5. The portable communication device as defined in claim 4,
   said portable communication device designating a forwarding third party in the response signal that the switching is impossible and letting the opposite party call out the designated third party.

6. A portable communication device, comprising:
   wireless voice communication means;
   wireless data communication means adopting a different communication mode from a communication mode of said wireless voice communication means, said wireless voice communication means and said wireless data communication means being incapable of being used simultaneously;
   selecting means for enabling one of said two communication means to be used; and
   control means for transmitting, to a receiving communication device of an opposite party by said wireless data communication means, a request for switching from said wireless data communication means to said wireless voice communication means through a predetermined signal, and then transmitting to said selecting means an instruction signal enabling said wireless voice communication means to be used.

7. The portable communication device as defined in claim 6, said control means including:
  a judging section for judging whether the signal requesting the switching of the communication means is included in a signal externally received;
  a decision-making section for deciding, when said judging section judges that the signal requesting the switching is included, whether the switching of said communication means is performed; and
  an outputting section for outputting, when said decision-making section decides that the switching of said communication means is performed, the instruction signal.

8. A portable communication device comprising:
wireless voice communication means;
wireless data communication means adopting a different communication mode from a communication mode of said wireless voice communication means, said wireless voice communication means and said wireless data communication means being incapable of being used simultaneously;
selecting means for enabling one of said two communication means to be used;
control means for outputting to said selecting means an instruction signal enabling said wireless voice communication means, when said wireless data communication means is being used, and said wireless data communication means externally receives a signal requesting switching of said communication means;
said control means including:
  a judging section for judging whether the signal requesting the switching of the communication means is included in a signal externally received;
  a decision-making section for deciding, when said judging section judges that the signal requesting the switching is included, whether the switching of said communication means is to be performed; and
  an outputting section for outputting, when said decision-making section decides that the switching of said communication means is performed, said instruction signal to the selecting means, wherein
  said decision-making section including:
    a display section for displaying a message when said judging section judges that the signal requesting the switching is included; and
    an input section for enabling a user to decide whether the switching of said communication means is to be performed according to the message displayed on the displayed section.

9. A portable communication device comprising:
wireless voice communication means;
wireless data communication means adopting a different communication mode from a communication mode of said wireless voice communication means, said wireless voice communication means and said wireless data communication means being incapable of being used simultaneously;
selecting means for enabling one of said two communication means to be used;
control means for outputting to said selecting means an instruction signal enabling said wireless voice communication means, when said wireless data communication means is being used, and said wireless data communication means externally receives a signal requesting switching of said communication means;
said control means including:
  a judging section for judging whether the signal requesting the switching of the communication means is included in a signal externally received;
  a decision-making section for deciding, when said judging section judges that the signal requesting the switching is included, whether the switching of said communication means is to be performed; and
  an outputting section for outputting, when said decision-making section decides that the switching of said communication means is performed, said instruction signal to the selecting means, wherein
  said decision-making section including:
    a clock section for outputting time information;
    a memory section for storing information representative of a time period during which the switching of said communication means is possible; and
    a processing section for deciding whether the switching of said communication means is to be performed according to the time information and the time period information.

10. A portable communication device having wireless voice communication means and wireless data communication means which each adopt different communication modes and are not used simultaneously,
  said portable communication device having means for switching from a data mode to a voice mode in response to a transmitted request to initiate a voice communication from another communication device, and
  said means for switching including a judging means to determine whether switching from data to voice modes is appropriate according to a setting of said portable communication device;
  wherein if the judging means determines that switching is appropriate, said portable communication device transmits to the other communication device a response that the switching is appropriate and switches the portable communication device to a stand-by state to receive wireless voice communications, and
  if the judging means determines that switching is not appropriate, the portable communication device transmits a response that switching is not appropriate.

11. A portable communication device, comprising:
wireless voice communication means having a wireless voice communication mode;
wireless data communication means having a data communication mode, said wireless voice communication means and said wireless data communication means being operated exclusively of one another;
selecting means for enabling one of said communication means to be selected for use; and
control means for generating a control signal for the selecting means in response to a signal from another device requesting the personal communication device to switch modes, wherein said control means further determines whether switching is appropriate according to a setting of said portable communication device, then, upon determining that switching is appropriate, transmits a response that the switching is possible through a predetermined signal and switches the personal communication device to a stand-by state to receive a wireless voice communication, and transmits a response that the switching is not appropriate through a predetermined signal if a determination is made that switching is not appropriate.

* * * * *